Jan. 20, 1942.     J. CANETTA     2,270,413
SPEED CONTROLLED BRAKE
Filed June 28, 1940
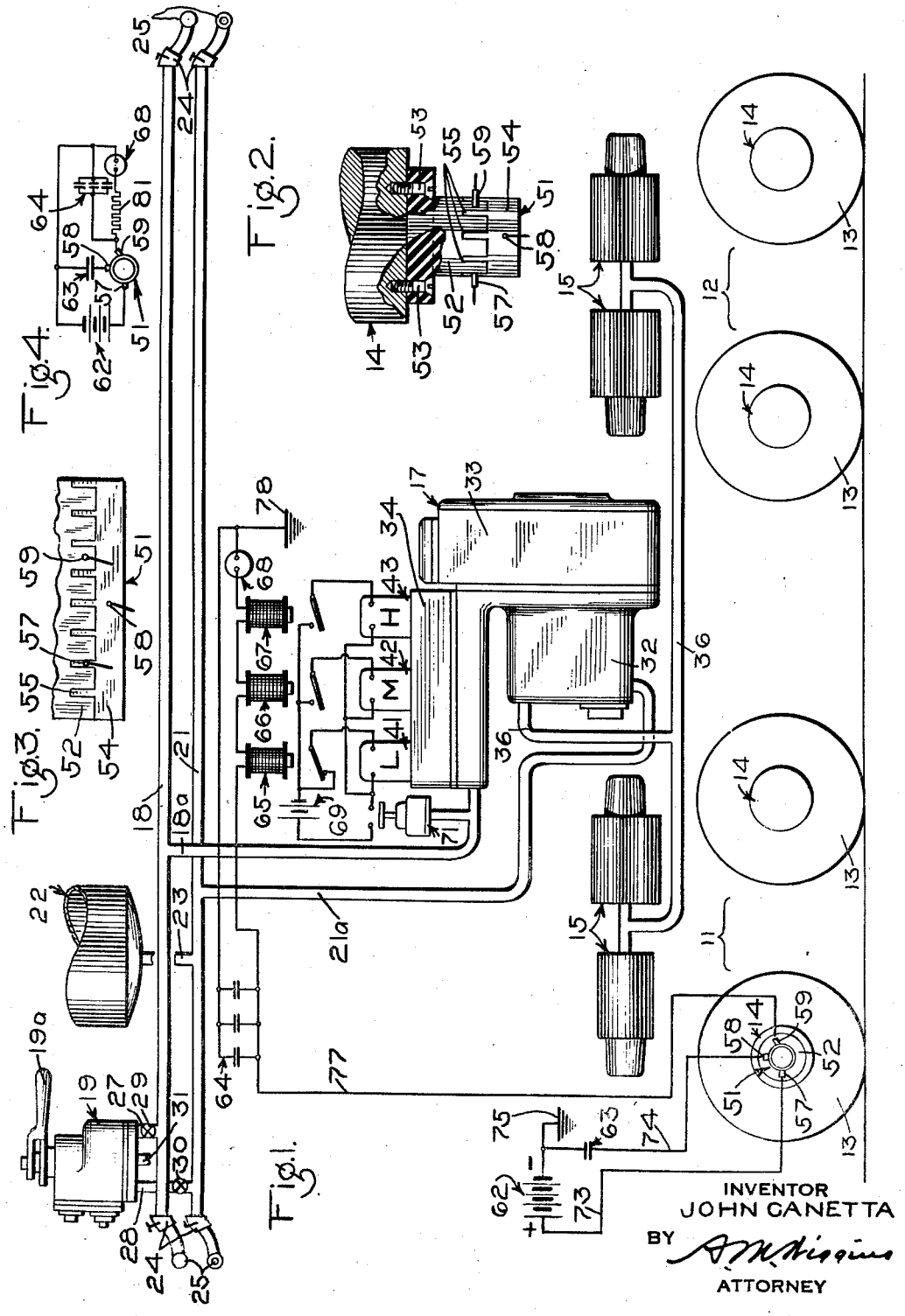
INVENTOR
JOHN CANETTA
BY
ATTORNEY Patented Jan. 20, 1942

2,270,413

UNITED STATES PATENT OFFICE 2,270,413

SPEED CONTROLLED BRAKE

John Canetta, Wilkinsburg, Pa., assignor to The Westinghouse Air Brake Company, Wilmerding, Pa., a corporation of Pennsylvania Application June 28, 1940, Serial No. 342,935

3 Claims. (Cl. 303—21)

This invention relates to speed-controlled brakes for vehicles, such as railway cars and trains, and has particular reference to brake control equipment for automatically varying the degree of application of the brakes on a vehicle as the speed of the vehicle varies.

As is well known, the coefficient of friction between the brake shoes and the rim or tread of a railway car wheel decreases as the speed of rotation of the wheel increases and, conversely, such coefficient increases as the speed of the wheel decreases. With a given fluid pressure established in the brake cylinder operating a brake shoe, the degree of the brake application automatically increases as the speed of the car decreases because the frictional retarding force on the wheel is equal to the product of the brake cylinder applied force pressing the brake shoe to the wheel and the coefficient of friction between the brake shoe and the rim of the wheel.

In order, therefore, to prevent the degree of the brake application from increasing to such an extent as to exceed the limit of rolling friction or adhesion between the wheel and the rail and thus to cause the locking of the wheel and the consequent sliding thereof, the operators of railway cars and trains have customarily in the past effected manually a reduction of the brake cylinder pressure as the speed of the car or train reduces. More recently, mechanical or electrical governors of various types have been proposed for automatically reducing the brake cylinder pressure and consequently the degree of application of the brakes as the speed of the car or train reduces.

It is an object of my invention to provide novel electrical apparatus responsive to the speed of rotation of a vehicle wheel and therefore to the speed of vehicle travel for automatically effecting a reduction in the degree of application of the brakes as the speed of the vehicle reduces.

Another object of my invention is to provide novel electrical apparatus for indicating the speed of rotation of a rotary element.

Another object of my invention is to provide brake control equipment for vehicles including a novel electrical apparatus responsive to the speed of rotation of a vehicle wheel for automatically effecting a reduction in the degree of application of the brakes as the speed of the vehicle reduces.

The above objects, and other objects of my invention which will be made apparent hereinafter, are attained by means of the apparatus shown in the accompanying drawing and subsequently to be described. In the accompanying drawing, Fig. 1 is a diagrammatic view, showing in simplified form one embodiment of my invention for controlling the brakes on a railway car, Fig. 2 is a fragmental enlarged view, partly in section, showing the construction of the commutator device shown in Fig. 1, Fig. 3 is a diagrammatic view, showing a development of the commutator device shown in Fig. 2, and Fig. 4 is a diagrammatic view, showing a modification of my invention employed solely for the purpose of indicating the speed of a rotating element.

*Description of embodiment shown in Fig. 1*

Referring to Fig. 1, the brake control equipment shown illustratively is that for a single railway car having two four-wheel trucks 11 and 12 located respectively at opposite ends thereof, each truck having a pair of wheel units severally comprising a pair of wheels 13, only one of which is shown, connected by and fixed to an axle 14. The structural details of the truck frames are omitted for simplicity.

Also omitted for simplicity are the conventional brake shoes, adapted to engage the rims of the wheels 13, and the brake rigging or levers whereby the brake shoes are applied and released according to the supply of fluid under pressure to and the release of fluid under pressure from suitable brake cylinders 15.

In Fig. 1, one brake cylinder 15 is provided for each wheel unit of each truck for applying and releasing the brakes of the corresponding wheel unit. Obviously, the number of brake cylinders provided for each truck may be varied, if desired, to provide a single brake cylinder for applying and releasing the brakes associated with the four wheels of a truck or an individual brake cylinder may be provided for applying and releasing the brakes associated with an individual wheel.

One of the brake cylinders 15 associated with one of the wheel units of the truck 11 is indicated as of smaller diameter than the other brake cylinders so that for an equivalent fluid pressure therein, a lesser braking force is exerted thereby to apply the brake shoes for the corresponding wheel unit. The reason for the smaller-sized brake cylinder is to prevent the application of the brakes associated with the one wheel unit to a sufficient degree to cause sliding of the wheels thereof. It will be assumed, therefore, that the wheel unit on which the brakes are applied by the smaller brake cylinder will always rotate at a speed corresponding to vehicle speed. The reason for this expedient will be made clear hereinafter.

The supply of fluid under pressure to and the release of fluid under pressure from the brake cylinders 15 is effected by a so-called speed-controlled valve mechanism 17 of well-known construction which is in turn operatively controlled according to the pressure in a pipe 18, hereinafter referred to as the control pipe.

The pressure of the fluid in the control pipe 18 is controlled by the operator through the medium of a self-lapping brake valve 19 of well-known construction. Brake valve 19 is adapted to supply fluid under pressure to the control pipe 18 from a pipe 21, hereinafter referred to as the supply pipe. A reservoir 22, hereinafter referred to as the main reservoir, is constantly connected through a branch pipe 23 to the supply pipe 21 so that the supply pipe 21 is constantly charged to a fluid pressure corresponding to that in the reservoir 22. The reservoir 22 is charged to its normal pressure, such as one hundred pounds per square inch, by means of a fluid compressor not shown.

As indicated in Fig. 1, the control pipe 18 and supply pipe 21 are provided at opposite ends thereof with angle cocks 24 and hose couplings 25 in the conventional manner of train pipes. When the car having the pipes 18 and 21 operates alone, the angle cocks 24 are closed. When the car having the pipes 18 and 21 is connected in a train, the angle cocks between successive cars are opened and the sections of the pipes 18 and 21 on successive cars connected through the hose couplings 25 in the usual manner.

The brake valve 19 is connected to the pipes 18 and 21 by branch pipes 27 and 28 respectively in which suitable manually operated valves 29 and 30 are interposed. The valves 29 and 30 are effective when closed to cut the brake valve 19 out of operation and when opened to cut the brake valve 19 into operation. When the car is connected in a train and it is desired to control the pressure in the control pipe 18 by a brake valve on another car, the valves 29 and 30 are closed.

The brake valve 19 is so well-known as not to require any description thereof. Briefly, however, it comprises a rotary operating shaft on which is a handle 19a for rotarily shifting the operating shaft. In the normal or brake release position of the handle 19a, the valve mechanism of the brake valve is conditioned to effect the exhaust of fluid under pressure from the control pipe 18 to atmosphere through an exhaust port and pipe 31 at the brake valve. When the brake valve handle 19a is shifted in a horizontal plane into a so-called application zone, the valve mechanism of the brake valve is operated to supply fluid under pressure from the control pipe 21 and connected reservoir 22 to the control pipe 18 to establish a pressure therein which is substantially proportional to the degree of displacement of the brake valve handle 19a out of its brake release position. If the pressure in the control pipe 18 tends to reduce, due to leakage or other causes, the brake valve 19 operates automatically to maintain a pressure therein corresponding to the position of the brake valve handle.

The speed-controlled valve mechanism 17 is well-known but a brief description thereof is believed desirable. It comprises a self-lapping relay valve section 32, a diaphragm section 33, and a magnet valve section 34.

The relay valve section 32 embodies a high-capacity super-sensitive self-lapping relay valve mechanism including a supply and a release valve, respectively, operative to supply fluid under pressure from a branch pipe 21a of the supply pipe to a pipe 36 having two branches leading to the brake cylinders 15 of each wheel truck 11 and 12 and to release fluid under pressure from the brake cylinders 15 through an exhaust port not shown.

Operation of the relay valve section 32 is effected by means of four coaxially spaced and unconnected diaphragms in the diaphragm section 33 which are adapted to be selectively subjected in balanced and unbalanced relation to fluid under pressure supplied from a branch pipe 18a of the control pipe 18 to exert an operating force on the relay valve mechanism of the relay valve section 32 variable in accordance with the effective area of the diaphragms and the pressure of the fluid supplied thereto. The diaphragms are of successively decreasing effective pressure areas and may have any desired ratio to one another. For the purpose of illustration, it will be assumed that the four diaphragms have effective pressure areas of ten, eight, six, and four units of area respectively.

The magnet valve section 34 comprises three magnet valves 41, 42, and 43. When its magnet winding is deenergized, the magnet valve 41 establishes communication through which fluid under pressure is supplied from the branch pipe 18a to the chamber formed between the diaphragms of four and six units of area respectively. When its magnet winding is energized, the magnet valve 41 closes the supply communication just described and establishes a communication through which fluid under pressure is exhausted from the chamber between the said two diaphragms at a controlled rate.

When its magnet winding is energized, the magnet valve 42 establishes communication through which fluid under pressure is supplied from the branch pipe 18a to the chamber formed between the diaphragms of six and eight units of area respectively. When its magnet winding is deenergized, the magnet valve 42 closes the supply communication, just described and establishes a communication through which fluid under pressure is exhausted from the said chamber at a controlled rate.

When its magnet winding is energized, the magnet valve 43 establishes communication through which fluid under pressure is supplied from the branch pipe 18a to the chamber formed between the diaphragms of eight and ten units of area respectively. When its magnet winding is deenergized, the magnet valve 43 closes the supply communication just described and establishes a communication through which fluid under pressure is exhausted at a controlled rate from such chamber.

The chamber formed at the outer face of the smaller diaphragm of four units of area is constantly subject to the pressure supplied from the branch pipe 18a of the control pipe 18.

It will thus be seen that by selectively energizing and deenergizing the magnet windings of the magnet valves 41 and 42 and 43, fluid under pressure may be supplied selectively to the outer face only of the smallest diaphragm and to one or more of the chambers formed between successive diaphragms to selectively render any of the diaphragms effective to operate the relay valve mechanism of the relay valve section 32.

Thus, if only the magnet winding of the magnet valve 41 is energized, the smallest diaphragm is effective. If the magnet windings of all of the magnet valves are deenergized, the diaphragm of six units of area is effective. If the magnet winding of only the magnet valve 42 is energized, the diaphragm of eight units of area is effective. If the magnet winding of both the magnet valves 42 and 43 are simultaneously energized while the magnet winding of the magnet valve 41 is deenergized, the largest diaphragm of ten units of area is effective.

It will be seen, therefore, that the operating force exerted to operate the relay valve section 32 varies in accordance with the area of the effective diaphragm, assuming a given control fluid pressure. Consequently, the self-lapping valve mechanism of the relay valve section 32 will operate to supply fluid at a pressure in varying ratios to and percentages of the pressure established in the control pipe 18 depending upon the diaphragm of the diaphragm section 33 which is rendered effective. Upon analysis it will be seen, therefore, that when only the magnet winding of the magnet valve 41 is energized, the pressure of the fluid supplied to the brake cylinder pipe 36 and thus established in the brake cylinders 15 will be forty percent of the pressure established in the control pipe 18. When the magnet windings of all the magnet valves are deenergized, the pressure of the fluid established in the brake cylinders 15 will be sixty percent of the pressure established in the control pipe 18. When the magnet winding of only the magnet valve 42 is energized, the pressure established in the brake cylinders will be eighty percent of the pressure established in the control pipe 18. When the magnet windings of the magnet valves 42 and 43 are simultaneously energized while that of the magnet valve 41 is deenergized, the pressure established in the brake cylinders 15 will be equal to the pressure established in the control pipe 18.

According to my invention, I propose to provide novel electrical apparatus for selectively energizing and deenergizing the magnet windings of the magnet valves 41, 42 and 43 of the speed-controlled valve mechanism 17 in different combinations according to the speed of travel of the car whereby the degree of application of the brakes, as determined by the pressure established in the brake cylinders 15, will be varied automatically as the speed of the car varies.

This novel electrical apparatus comprises a commutator or switch device 51 adapted to be rotated in accordance with the speed of rotation of the wheel unit having the smaller brake cylinder 15 associated therewith, as by being attached to the end of the axle 14 of the wheel unit in the manner shown in Fig. 2. As shown in Fig. 2, the commutator device 51 may comprise a cylindrical base portion 52 of insulating material and having an end flange secured as by a plurality of screws 53 in coaxial relation to the end of the axle 14. Embedded in the outer end surface of the base 52 is a ring 54 of conducting material, such as copper, brass or suitable alloys thereof. Formed on the ring 54 are a plurality, illustratively shown as eight, equally spaced projecting contact fingers 55 which extend in an axial direction in flush relation with the outer surface of the base 52 in the manner of commutator bars for electric motors and generators.

Associated with the commutator device 51 are three brushes or contact fingers 57, 58 and 59 respectively which are adapted to be mounted, as by suitable brush holding apparatus, to a stationary part of the vehicle, for example, the inner surface of the journal casing at the end of the axle. The brushes 57 and 59 are located in substantially the same plane transversely of the axle so as to engage and disengage the successive contact fingers 55 as the commutator device rotates with the axle. The brush 58 constantly engages the continuous portion of the annular ring 54.

The angular spacing between the brushes 57 and 59 is such that they alternately engage the contact fingers 55. This is clearly apparent from Fig. 3, in which the brush 57 is shown engaging a contact finger 55, whereas the brush 59 is midway between two contact fingers out of engagement therewith. Obviously, the brushes 57 and 59 may have any desired angular relation as long as the alternate engagement thereof with the contact fingers 55 is effected upon rotation of the base 52.

It will be apparent, therefore, that upon rotation of the commutator device 51, the brush 58 is alternately connected to the brush 57 and to the brush 59 through the annular ring 54 and contact fingers 55. The manner in which the commutator device is utilized will be made apparent presently.

The electrical apparatus previously mentioned further includes a source of direct-current voltage such as a storage battery 62, an electrical condenser 63, a condenser bank or unit 64 of relatively large capacity compared to that of the condenser 63, a plurality of current-responsive relays 65, 66 and 67 respectively, a speed-indicator 68 in the form of a current-measuring device similar in construction and operation to a standard ammeter, a second source of direct-current voltage, separate from the source 62, such as a second storage battery 69, and a fluid pressure operated switch 71.

One terminal of the battery 62, hereinafter referred to as the positive terminal, is connected by a wire 73 to the brush 57 of the commutator device 51. The brush 58 is connected by a wire 74 to one terminal of the condenser 63, the opposite terminal of the condenser 63 being connected to the negative terminal of the battery 62 which is grounded as at 75.

The operating windings of the three relays 65, 66 and 67 and of the speed-indicator 68 are connected in series relation in a wire 77 that is connected at one end to the brush 59 and at the other end to ground at 78.

The condenser unit 64 comprises, for purposes of illustration, a bank of three parallel-connected condensers and is connected in parallel or shunt relation to the windings of the relays and speed indicator 68 in the manner shown.

It will be apparent that when the brushes 57 and 58 are connected through the annular ring 54 of the commutator device 51, a circuit is established for charging the condenser 63 to a voltage corresponding to the voltage across the positive and negative terminals of the battery 62. When the brushes 58 and 59 are connected through the annular ring 54, the charging circuit for the condenser 63 is interrupted and a discharge circuit therefor established.

Since the lower terminal of the condenser 63 is connected to the positive terminal of the battery 62 while the charging circuit is established, it will be seen that current is discharged from the positively charged lower terminal of the condenser 63, upon the establishment of the discharge circuit through the wire 74, brush 58, an annular ring 54, brush 59, wire 77 including the windings of the three relays 65, 66 and 67, and of the speed indicator 68, and back through ground between the ground connections 78 and 75 to the opposite or upper terminal of the condenser 63.

The principle of operation of the apparatus is that if a condenser is charged over a circuit having a time constant that is small compared to the time of charging, the condenser will store the same quantity of electrical energy or charge each time it is connected to a constant voltage source independent of the time of connection to the source. If the charged condenser is permitted to discharge either substantially completely or the same quantity of charge into a suitable discharge circuit each time it is charged, and if the condenser is alternately charged and discharged repeatedly in rapid succession, a pulsating direct-current will flow in the discharge circuit, the average value of which is substantially proportional to the frequency or number of times per second the condenser is discharged.

The electrical charge stored on condenser 63 is equal to the product of the capacitance of the condenser and the voltage impressed across the terminals of the condenser. This relation is expressed mathematically as follows:

(1) $$Q = CE$$

Where Q is the quantity of electricity in coulombs, C is a constant, namely the capacitance of the condenser expressed in microfarads, and E is the voltage impressed across the terminals of the condenser, that is, the voltage of the battery 62.

Since an ampere, the unit of electrical current, is a coulomb per second, the current I, in amperes, discharged from condenser 63 through the discharge circuit may be expressed as (2) $$I = Qf$$

Where $f$ is the frequency or number of times per second the condenser is discharged. Obviously if Q is a constant, the current I in amperes is directly proportional to the frequency $f$.

By arranging the commutator device 51 to alternately charge and discharge the condenser 63 repeatedly in rapid succession at a frequency proportional to the speed of rotation of a vehicle wheel, it will be seen that the current in the discharge circuit wire 77 and including the windings of the three relays 65, 66 and 67 will be theoretically proportional to the speed of rotation of the wheel with which the commutator device 51 is associated.

In order to smooth out and stabilize fluctuations of the pulsating direct-current in the discharge circuit and insure desired operation of the relays 65, 66 and 67, the condenser unit 64 is provided. The capacity of the condenser unit is, therefore, considerably larger than that of the condenser 63. This larger capacity of the condenser unit 64 is indicated by the parallel arrangement of a plurality of condensers. It will be understood, however, that a single condenser of corresponding capacity may be provided in place of a bank of parallel-arranged condensers.

The condenser unit 64, by smoothing out the pulsations in the direct-current in the discharge circuit, also prevents fluttering of the indicating hand or needle of the speed-indicator 68 and insures a stable speed indication. If desired, speed-indicator 68 may be an ammeter of the thermal type which would inherently provide a stable indication notwithstanding pulsations of the direct-current in the discharge circuit.

In order to obtain the ideal situation, mentioned above in connection with Equation 2, of direct proportionality between the speed of rotation of the commutator device 51 and the current in the discharge circuit, it is essential that the quantity Q of electricity discharged from the condenser each time the discharge circuit is established be uniform or constant. Due to the fact that the voltage-drop across the windings of the three relays 65, 66 and 67 and the speed-indicator 68 varies in accordance with the current in the discharge circuit, the quantity of electricity Q discharged from the condenser 63 each time the discharge circuit is established is not uniform. It will be understood from Equation 1 that the quantity Q in coulombs discharged from condenser 63 upon the establishment of the discharge circuit is equal to the product of the capacitance of the condenser and the change in voltage across the terminals of the condenser. Since the polarity of the voltage-drop in the discharge circuit is in opposition to the polarity of the condenser 63, it will be apparent that the change in voltage across the terminals of the condenser 63 upon the establishment of the discharge circuit depends upon the voltage-drop in the discharge circuit. Thus, if the voltage-drop in the discharge circuit is expressed as $E_1$ and the voltage to which the condenser is charged, that is the voltage of the battery 62, is represented as E, then the quantity of electricity discharged from condenser 63 may be expressed as follows:

(3) $$Q = C(E - E_1)$$

Obviously, since $E_1$ will increase with an increase of the rotational speed of the commutator device 51, it will be seen that the quantity Q of electricity discharged from the condenser 63 will be less at the higher speeds of the commutator device than at the lower speeds thereof. This, of course, means that the current in the discharge circuit will increase a lesser amount for each successive increment of speed change as the speed increases.

It will be noted, however, that there will be a particular current in the discharge circuit corresponding to each speed of rotation of the commutator device 51. Accordingly, the scale on the speed-indicator 68 is so calibrated as to correctly indicate the actual speed of rotation of the commutator device, either in revolutions per minute or miles per hour. The spacing between successive graduations of the scale of the speed-indicator 68 will obviously be less as the speed increases and vice versa.

It should be understood that the percentage of variation from direct proportionality of the current in the discharge circuit and the speed of rotation of the commutator device may be minimized by providing a voltage source, corresponding to source 62, which is relatively high in comparison to the voltage-drop in the discharge circuit. Referring to Equation 3 it will be seen that if $E_1$ is very small with respect to E, then the variation of the quantity Q of electricity discharged from the condenser 63 at a relatively high speed and at a relatively low speed of the commutator device 51 will be a minimum. By thus keeping the quantity Q of electricity discharged from condenser 63 substantially uniform each time the condenser discharge circuit is established, the ideal situation mentioned in connection with Equation 2 is closely approached.

I prefer, therefore, to use a source, corresponding to the storage battery 62, of relatively high voltage. The higher constant voltage may best be obtained from a flat-compounded direct-current generator driven at a constant speed.

The windings of the three relays 65, 66 and 67 are so designed that the single contact member of each relay is picked-up when the current in the discharge circuit exceeds certain predetermined different values respectively. For example, the winding of the relay 65 is so designed that when the current in the discharge circuit exceeds a value corresponding to a speed of rotation of the wheel unit with which the commutator device 51 is associated occurring at twenty miles per hour vehicle travel, the contact member of the relay will be picked-up. The contact member of the relay 65 is a back-contact, that is, it is in closed position when dropped-out and in open position when picked-up. The contact member of the relay 65 is in series relation with the pressure switch 71 and jointly therewith controls the simple circuit including the magnet winding of the magnet valve 41 of the speed-controlled valve mechanism 17 and the battery 69.

The magnet winding of the relay 66 is so designed that when it is energized by a current exceeding a certain value corresponding to a speed of rotation of the wheel unit with which the commutator device 51 is associated occurring at a vehicle speed of forty miles per hour, the contact member of the relay is picked-up. The contact member of relay 66 is a front-contact, that is, it is in open position when the relay is dropped-out and is actuated to a closed position when the relay is picked-up. The contact member of the relay 66 and pressure switch 71 jointly control a circuit for energizing and deenergizing the magnet winding of the magnet valve 42 of the speed-controlled valve mechanism 17.

The winding of the relay 67 is so designed that when it is energized by a current exceeding a value corresponding to a rotational speed of the wheel unit with which the commutator device 51 is associated occurring at a vehicle speed of seventy miles per hour, the contact member of the relay is picked-up. The contact member of the relay 67 is a front-contact, that is, it is in open position when the relay is dropped-out and is actuated to a closed position when the relay is picked-up. The contact member of the relay 67 and pressure switch 71 jointly control a circuit for energizing and deenergizing the magnet winding of the magnet valve 43 of the speed-controlled valve mechanism 17.

It is well known that due to the reduction in the air-gap between the movable armature and the magnetic core of conventional relays after the relay is picked-up, a lesser current is required for energizing the operating winding of the relay to maintain the relay picked-up than was originally required to cause it to be picked-up. It follows, therefore, that if the contact members of the relay 65, 66 and 67 are picked-up only when the current energizing the winding of the corresponding relays exceeds certain predetermined values, the contact members of these relays will not be restored to dropped-out positions thereof until the current energizing the winding reduces somewhat below the value required to cause the contact members to be picked-up. This means, of course, that the relays 65, 66 and 67 will be picked-up at certain vehicle speeds and dropped-out at vehicle speeds which are somewhat lower than the picked-up speed. Thus, if the contact member of the relay 65 is picked-up only at a speed exceeding twenty miles per hour, it may not drop-out until the vehicle speed reduces below fifteen miles per hour. In a similar manner, the contact members of relays 66 and 67 may not be dropped-out until the speed of the vehicle reduces a corresponding amount below the speed at which the contact members were picked-up.

The relays 65, 66 and 67 may be designed, constructed or arranged so as to pick-up and drop-out at substantially the same vehicle speed, respectively. Various arrangements have been devised for this purpose and if desired may be employed in connection with the relays 65, 66 and 67. The fact that the relays 65, 66 and 67 do not pick-up and drop-out at exactly the same vehicle speed, respectively, does not affect the operation of the equipment in a practical manner.

The pressure switch 71 controlling the energizing circuits of the magnet windings of the magnet valves 41, 42 and 43 jointly with the respective relays 65, 66 and 67 may be of any suitable type but is preferably of the snap acting type. The pressure switch 71 is so designed as to be actuated to a closed position when the pressure in the control pipe 18 and the branch pipe 18a exceeds a certain low pressure, such as five pounds per square inch, and to be restored to open position when the pressure reduces below said pressure. Since the pressure in the control pipe 18 is not reduced below five pounds per square inch except upon the complete release of the brakes, it will be seen that the pressure switch 71 is adapted to be closed during an application of the brakes and opened only when the brakes are released. As will hereinafter appear more clearly, the purpose of the pressure switch 71 is to prevent draining of current from the battery 69 when the brakes are released.

*Operation of equipment shown in Fig. 1*

Let it be assumed that the main reservoir 22 and the supply pipe 21 are charged to the normal pressure carried therein, such as one hundred pounds per square inch, that the vehicle having the equipment shown in Fig. 1 is a single car traveling under power at a speed, such as eighty miles per hour, the brakes being released, and that the operator desires to effect an application of the brakes to bring the car to a stop. To effect an application of the brakes, the operator first shuts off the propulsion power and then shifts the brake valve handle 19a out of its normal brake release position into the application zone thereof an amount corresponding to the desired degree of application of the brakes. Let it be assumed that the operator so positions the brake valve handle 19a that a pressure of fifty pounds per square inch is established in the control pipe 18. When the pressure in the control pipe 18 exceeds five pounds per square inch the pressure switch 71 closes. With the car traveling at a speed, such as eighty miles per hour, which is in excess of that required to pick-up the relay 67, it will be seen that all of the relays 65, 66 and 67 will be picked-up. Accordingly, the circuit for energizing the magnet winding of the magnet valve 41 is interrupted due to the pick-up of the contact of the relay 65, whereas the circuits for energizing the magnet windings of the magnet valves 42 and 43 are respectively established due to the pick-up of the contact members of the relays 66 and 67.

It will be recalled from previous description that, in such case, the speed-controlled valve mechanism 17 is operated to supply fluid to the pipe 36 and brake cylinders 15 at a pressure which is equal to the pressure established in the control pipe 18.

The brakes will accordingly be applied initially on all the wheels of the vehicle at substantially uniform degrees of application, excepting those associated with the wheel unit having the commutator device 51. As previously pointed out, the brakes associated with this wheel unit are applied by a brake cylinder of smaller diameter than the remaining brake cylinders. Accordingly, the brakes associated with the wheel unit having commutator device 51 are applied with lesser force than the brakes associated with the other wheel units. The reason for applying the brakes associated with the wheel unit having commutator device 51 with lesser force than the brakes associated with the other wheel units is to insure continued rotation of this particular wheel unit at a speed which corresponds to the speed of travel of the vehicle. Obviously, if the wheel unit with which the commutator device 51 is associated were permitted to slip, that is rotate at a speed less than a speed corresponding to vehicle speed, and then slide, that is be dragged along the rails in a locked condition due to excessive application of the brakes, the control exercised by the relays 65, 66 and 67 over the magnet valves of the speed-controlled valve mechanism 17 would be destroyed. The purpose of employing a smaller brake cylinder for applying the brakes associated with the wheel unit having commutator device 51 is, therefore, to insure the continued control of the speed-controlled valve mechanism 17 in accordance with the speed of travel of the vehicle. This expedient has been previously employed and is not of my invention.

When the speed of the car reduces somewhat below seventy miles per hour, the relay 67 is dropped-out and due to the restoration of its contact member to its open position, interrupts the circuit for energizing the magnet winding of the magnet valve 43. Fluid under pressure is accordingly vented at a controlled rate from the chamber between the two diaphragms having ten and eight units of area respectively. After a predetermined lapse of time, when said chamber is completely vented, the diaphragm of eight units of area becomes solely effective to cause operation of the relay valve section 32. The relay valve section 32 of the valve mechanism 17 accordingly operates in response to the deenergization of the magnet winding of the magnet valve 43 to effect the reduction of the pressure in the brake cylinder 15 at a controlled rate down to a value which is eighty per cent of that in the control pipe 18, or forty pounds per square inch. The degree of application of the brakes associated with the vehicle wheels is accordingly reduced at a controlled rate to a value corresponding to forty pounds per square inch.

When the speed of the vehicles reduces below a value somewhat below forty miles per hour, the relay 66 drops-out and, due to the restoration of the contact member thereof to its open position, interrupts the circuit for energizing the magnet winding of the magnet valve 42. Magnet valve 42 accordingly operates to vent at a controlled rate the fluid under pressure from the chamber between the diaphragms of eight and six units of area. The relay valve section 32 is correspondingly operated to effect reduction of the pressure in the brake cylinders at a corresponding rate. When the fluid under pressure in the said chamber is completely vented, the diaphragm of six units of area is solely effective to operate the relay valve section 32. The pressure to which the pressure in the brake cylinders 15 is thus reduced will be sixty per cent of the pressure established in the control pipe or thirty pounds per square inch. The degree of application of the brakes associated with the vehicle wheels is thus first reduced at a controlled rate to a degree corresponding to thirty pounds per square inch when the speed of the car reduces somewhat below forty miles per hour.

When the speed of the car reduces somewhat below twenty miles per hour, the relay 65 drops-out and the back contact thereof is accordingly effective in its closed position to establish a circuit for energizing the magnet winding of the magnet valve 41. Magnet valve 41 accordingly operates to vent fluid under pressure from the chamber between the diaphragms of six and four units of area respectively at a controlled rate. The relay valve section 32 correspondingly operates to effect the reduction of the pressure in the brake cylinders at a controlled rate in response to the diminishing operating fluid pressure. When the fluid pressure in the said chamber is entirely vented, the diaphragm of four units of area is solely effective to operate the relay valve section 32 and thus the pressure in the brake cylinders 15 is reduced to a value which is forty per cent of that established in the control pipe 18, or twenty pounds per square inch.

Thereafter, as the speed of the car reduces toward zero speed or stopped condition, no further change in the condition of the speed-controlled valve mechanism 17 occurs. Consequently, the brakes will remain applied at a degree corresponding to forty per cent of that established in the control pipe or twenty pounds per square inch until the vehicle comes to a complete stop, unless the pressure in the control pipe 18 is varied by operation of the brake valve 19. It will be apparent that the operator may vary the pressure in the control pipe during an application of the brakes. Thus if the operator operates brake valve 19, while the car is traveling at a speed somewhat less than twenty miles per hour, so as to reduce the pressure in the control pipe from fifty to forty pounds per square inch, the relay valve section 32 of the speed-controlled valve mechanism 17 operates to correspondingly reduce the pressure supplied to the brake cylinders 15 to forty per cent of forty pounds per square inch or sixteen pounds per square inch. It will be seen, therefore, that the amount of variation of pressure in the brake cylinders 15 is not the same as the amount of variation of the pressure in the control pipe 18, and that the ratio between the pressure in the brake cylinders and that in the control pipe 18 remains the same for a given speed range.

When the vehicle comes to a complete stop, the brakes remain applied to a degree depending upon the pressure in the brake cylinders which will be forty per cent of that established in the control pipe 18. If the operator desires to increase the degree of application of the brakes, while the vehicle is stopped, so as to prevent creeping of the car when stopped on a grade, the speed-controlled valve mechanism 17 will operate to proportionately increase the pressure in the brake cylinders in correspondence with the increase in pressure in the control pipe 18.

In order to release the brakes prior to again starting the car, the operator merely restores the brake valve handle 19a to its brake release position, thus venting the fluid under pressure from the control pipe and restoring the pressure therein to atmospheric pressure. The relay valve section 32 of the speed-controlled valve mechanism 17 is accordingly operated in response to the reduction of pressure in the control pipe 18 to correspondingly vent fluid under pressure from the brake cylinders 15 to effect a complete release of the brakes.

When the pressure in the control pipe 15 is restored to atmospheric pressure upon the complete release of the brakes, the pressure switch 71 is restored to its open position, thereby interrupting the circuit for energizing the magnet winding of the magnet valve 41 and preventing the continued drainage of current thereby from the storage battery 69 while the brakes are released.

If the application of the brakes is initiated while the car is traveling at some speed between forty and seventy miles per hour, such as fifty miles per hour, it will be understood that only the magnet winding of the magnet valve 42 will be energized and that the speed-controlled valve mechanism 17 will accordingly operate to supply fluid to the brake cylinders at a pressure which is eighty per cent of that established in the control pipe. Thereafter, as the car speed reduces, the speed-controlled valve mechanism 17 will be variously conditioned to successively reduce the brake cylinder pressure to sixty and forty per cent of the control pipe pressure, in the manner previously described.

If the application of the brakes is initiated while the car is traveling at some speed between twenty and forty miles per hour, such as thirty miles per hour, the magnet windings of all of the magnet valves 41, 42 and 43 will be deenergized and thus the speed-controlled valve mechanism will operate initially to supply fluid to the brake cylinders at a pressure which is sixty per cent of that in the control pipe and thereafter reduce the brake cylinder pressure to forty per cent of the control pipe pressure.

If the application of the brakes is initiated while the car is traveling below twenty miles per hour, the magnet windings of only the magnet valve 41 will be energized and thus the speed-controlled valve mechanism 17 will operate initially to supply fluid to the brake cylinders at a pressure which is forty per cent of that established in the control pipe and no change in this percentage takes place thereafter as the car decreases to zero speed or stopped position.

*Adaptation of equipment shown in Fig. 1 to a train of cars*

The equipment shown in Fig. 1 may be adapted for use in a train of cars in different ways. For example, each car may be provided with a commutator device 51 and associated equipment whereby the magnet valves of the speed-controlled valve mechanism 17 on each car are controlled according to the rotational speed of a wheel on the corresponding car. On the other hand, if desired, only one car may be provided with a commutator device 51 and the one set of relays 65, 66 and 67 associated therewith arranged to effect energization or deenergization of three train wires to which the magnet windings of the magnet valves 41, 42 and 43 on the different cars are connected. In such case, the pressure switch 71 controls the connection from a fourth or common return train wire to the battery 69. Thus, in this instance, the magnet valves of the speed-controlled valve mechanisms 17 on the different cars are all controlled according to the rotational speed of a wheel on only one of the cars.

*Modification shown in Fig. 4*

It will be apparent that my invention may be employed apart from a brake control apparatus solely as a speed measuring and indicating mechanism in the manner illustrated in Fig. 4. In Fig. 4, the commutator device 51 may be rotated in accordance with the rotational speed of any rotating element, the rotational speed of which it is desired to measure. The arrangement shown in Fig. 4 is identical in principle to that illustrated in Fig. 1 and differs therefrom structurally only in the substitution of a resistor 81 for the three relays 65, 66 and 67 and in the elimination of the ground connections 75 and 78. Other parts are designated by the same reference numerals as in Fig. 1. If speed-indicator 68 is an ammeter of the thermal type, the condenser unit 64 may be omitted for the reason that stable speed indications will be obtained without the use of the condenser unit.

*Summary*

Summarizing, it will be seen that I have disclosed a novel form of electrical apparatus including a commutator device rotated according to the speed of a rotating element for alternately charging and discharging a condenser and utilizing the discharge current as a measure of the speed of rotation of the rotating element for different purposes, such as controlling the degree of application of the brakes associated with vehicle wheels and/or indicating the speed of travel of the vehicle or the speed of rotation of the rotating element.

While I have shown and described only several specific forms of my invention, various omissions, additions, or modifications thereof may be made therein without departing from the spirit of my invention. It is accordingly not my intention to limit the scope of my invention except in accordance with the terms of the appended claims.

Having now described my invention, what I claim as new and desire to secure by Letters Patent is:

1. In a brake control apparatus for a wheeled vehicle of the type having a pipe chargeable with fluid at different pressures to select the degree of application of the brakes associated with the vehicle wheels, and variably conditionable means responsive to a given pressure in said pipe for causing fluid to be supplied at any one of a plurality of different pressures depending upon the condition thereof to cause the application of the brakes to corresponding different degrees; the combination of a source of direct-current voltage, an electrical condenser, a circuit, switch means operative to cause said condenser to be alternately charged to the voltage of said source and discharged into said circuit at a frequency proportional to the rotational speed of a wheel of the vehicle to provide a direct-current therein substantially proportional to the speed of the vehicle, and a plurality of relays each of which has an operating winding connected in said circuit and respectively responsive to different degrees of current in said circuit for causing an operative response of the corresponding relay, said relays being adapted to cause the variably conditionable means to be conditioned in any one of a plurality of different conditions depending upon which of said relays have operated in response to the current in said circuit.

2. In a brake control apparatus for a railway car having a pair of wheels fixed to an axle, said brake control apparatus being of the type having a pipe chargeable with fluid at different pressures to select the degree of application of the brakes and a variably conditionable relay valve means responsive to a given pressure in said pipe for causing fluid to be supplied at any one of a plurality of different pressures depending upon the condition thereof to cause the application of the brakes associated with the wheels to corresponding different degrees; the combination of a source of direct-current voltage, an electrical condenser, a circuit, a switch device having a rotary contact element secured to the end of the axle and a plurality of brushes cooperating with said rotary contact element in a manner to alternately connect said condenser to said voltage source and discharge said condenser into said circuit at a frequency proportional to the rotational speed of the axle whereby to provide a direct-current in said circuit substantially proportional to the speed of the vehicle, and a plurality of relays having operating windings connected in said circuit and respectively responsive to different degrees of current in said circuit for causing operation of the corresponding relays, said relays being adapted to cause said variably conditionable means to be conditioned in any one of a plurality of conditions depending upon which of said relays have operated in response to the current in said circuit.

3. In a brake control apparatus for a railway car having a pair of wheels fixed to an axle, said brake control apparatus being of the type having a pipe chargeable with fluid at different pressures to select the degree of application of the brakes associated with the vehicle wheels, and a relay valve device having a plurality of current responsive devices energizable and deenergizable in different combinations to condition the relay valve device selectively in any one of a plurality of conditions, said relay valve device being operative in response to a given fluid pressure in said pipe for causing fluid to be supplied at any one of a plurality of different pressures, depending upon the condition thereof, to cause application of the brakes to a corresponding degree; the combination of a source of direct-current voltage, an electrical condenser, a circuit, a switch device comprising a rotary element rotatable according to the rotational speed of the axle and three brushes associated therewith, said rotary element comprising a contact ring of conducting material having a continuous portion from which a plurality of contact fingers project laterally in substantially equal spaced relation, one of said brushes being so disposed as to engage only the continuous portion of said ring and the remaining two brushes being so disposed as to alternately engage only the contact fingers upon rotation of the rotary element, said one brush and one of the remaining two brushes being effective to cause the condenser to be connected to said voltage source, and said one brush and the other of the remaining two brushes being effective to connect said condenser in said circuit, the direct-current in said circuit thereby produced being substantially proportional to the speed of the vehicle, and a plurality of relays having respective operating windings connected in series relation in said circuit and respectively responsive to different degrees of current in the circuit for effecting an operative responsive of the corresponding relay, each of said relays being effective to control a corresponding one of the current-responsive devices of the relay valve device whereby to vary the condition of the relay valve device dependent upon which of said relays have operated in response to the current in said circuit.

JOHN CANETTA.